United States Patent
Johnson et al.

(10) Patent No.: US 8,368,876 B1
(45) Date of Patent: Feb. 5, 2013

(54) CALIBRATION SYSTEM AND METHOD FOR IMAGING FLASH LIDAR SYSTEMS

(75) Inventors: Michael D. Johnson, Friendswood, TX (US); Dwight E. Andrews, League City, TX (US)

(73) Assignee: Odyssey Space Research, L.L.C., Houston, TX (US)

(*) Notice: Subject to any disclaimer, the term of this patent is extended or adjusted under 35 U.S.C. 154(b) by 570 days.

(21) Appl. No.: 12/579,145

(22) Filed: Oct. 14, 2009

Related U.S. Application Data

(60) Provisional application No. 61/106,469, filed on Oct. 17, 2008.

(51) Int. Cl.
*G01C 3/08* (2006.01)
(52) U.S. Cl. ...... 356/5.01; 356/3.01; 356/3.1; 356/4.01; 356/5.1
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 4,121,890 A | * | 10/1978 | Braun | 356/4.02 |
| 5,606,409 A | * | 2/1997 | Schneiter | 356/4.02 |
| 5,825,464 A | * | 10/1998 | Feichtner | 356/4.02 |

* cited by examiner

*Primary Examiner* — Luke Ratcliffe
(74) *Attorney, Agent, or Firm* — Law Offices of Mark L. Berrier

(57) ABSTRACT

Systems and methods for calibrating a LIDAR unit. In one embodiment, a system includes a light pulse detection unit, a delay unit and a two-dimensional target. The light pulse detection unit receives a light pulse from the LIDAR unit. The delay unit produces one or more delayed light pulses which are delayed by a known interval from the light pulse received from the LIDAR unit. The delayed light pulses are used to illuminate the target. Target illumination from each of the delayed light pulses returns to the LIDAR unit with a corresponding known delay. The delay of each delayed light pulse simulates a range that is greater than the actual physical distance from the LIDAR unit to the target. The delay of the light pulses from different parts of the target may be different to simulate different ranges for the different parts of the target.

19 Claims, 8 Drawing Sheets

CALIBRATION SYSTEM AND METHOD FOR IMAGING FLASH LIDAR SYSTEMS

CROSS-REFERENCE TO RELATED APPLICATIONS

This application claims the benefit of U.S. Provisional Patent Application 61/106,469, filed Oct. 17, 2008, which is incorporated by reference as if set forth herein in its entirety.

BACKGROUND

1. Field of the Invention

The invention relates generally to systems and methods for calibrating and testing light-emitting apparatus for determining the range and/or velocity of remote objects and relates more particularly to calibrating a three dimensional light detection and ranging apparatus.

2. Related Art

There are a wide variety of applications for apparatus which determine the distance and/or the velocity of remote objects by means of detecting backscattered light. Laser radars (LIDARs) determine range in the atmosphere by measuring the transit time of a laser pulse from the transmitter/receiver to the target and dividing by twice the velocity of light in the atmospheric medium. Range resolution in such devices is related to the accuracy of this transit time measurement. In the atmosphere, ranges are typically measured in kilometers, where range resolution can be as small as 30 cm. A 3D target image can be obtained with a laser radar by rastering the laser beam across the target and measuring the transit time, pulse by pulse, where each pulse corresponds to a point on the target. The distance between points on the target determines the spatial resolution of the rastered image and defines the picture element (pixel) size; the number of pixels at the target determines the pixel-array size; the range resolution determines resolution in the third target dimension. Rastering is a slow process, particularly for large pixel-array sizes, and it requires cumbersome mechanical scanners and complex pixel-registration computer processing.

When high-speed imaging is required, it is desirable to obtain the entire image with one laser pulse. However, because of weight, cost and complexity problems, it is undesirable to obtain the entire image with independent, parallel, laser radar receivers, where each pixel uses a separate laser radar receiver system; multiplexing with one laser radar receiver should be used to make a large pixel-array imaging system practical. Currently lightweight, multiplexing laser radar receivers (Flash LIDAR) exist which can image an entire target with a single laser pulse. It accomplishes this feat by having the returning pulse stop a clock at each pixel. This clock can be a voltage ramp; that is a voltage which is decreasing in time. The voltage at which the ramp is switched off determines the time at which the laser pulse returned. The voltage ramp begins when the laser pulse is transmitted. Because stopping a clock or switching off a voltage ramp is usually dependent upon the returning-pulse amplitude for typical laser pulse widths (due to the clock-stopping circuitry) and the returning-pulse amplitude is dependent, pixel by pixel, on the reflectivity of the target, the range must be corrected for amplitude to obtain high range resolution. By means of switching off a ramping voltage, individually for each object pixel, the time of arrival of the reflected pulse is recorded. This time is related to the third object dimension. The device consists of the pulsed light source, optics for collecting the reflected light, a sensor for detecting the light, drive and output electronics for timing and signal conditioning of data generated by the sensors and a computer for processing the sensor data and converting it to a three dimensional image. The sensor collects and processes the light data in a unique manner, using a hybrid. The hybrid is actually a two dimensional array of collectors or detectors combined in very close proximity with their own processing electronics. In general, the hybrid is composed of two integrated circuit chips mated together. The two dimensional array defines two dimensions of the image. The processing electronics individually and independently switch off, at high-speed, a time varying voltage when the light pulse, reflected from the object, arrives at the sensor. The final voltages are stored and can be mathematically transformed to the third object dimension. The sensor also records peak light pulse information which can be used to obtain higher resolution in the third dimension.

Precise calculations of range, velocity, and other factors determined by the Flash LIDAR apparatus require that the LIDAR apparatus be precisely calibrated throughout the useful life of the apparatus. Conventionally, the calibration process is labor intensive. A lengthy testing range is prepared by providing a fine optical alignment between the Flash LIDAR apparatus and a distant "hard target" which consists of a three dimensional object. The return light signal scattered back from the hard target is received by the apparatus and is compared to expected signal characteristics of the target, the range geometry, and the atmospheric conditions. If the actual return light signal is different than the expected light signal, the apparatus is adjusted accordingly.

This conventional calibration approach often requires obtaining a right of access and a permit to transmit the laser beam over the range property or construction of a large and costly facility. Moreover, at least two persons are required during the initial alignment of the hard target, since the hard target may be one kilometer from the LIDAR apparatus. Another concern is that inclement weather will adversely affect the calibration process, since fog, rain and snow will introduce backscattering and severely attenuate the beam intensity over the open range. Furthermore, unless the output beam is eye-safe, safety measures must be used to assure that no person in the vicinity of the testing range receives excessive eye exposure to the laser beam energy. The conventional calibration process is applied to ocean-going LIDAR imaging in U.S. Pat. No. 5,311,272 to Daniels et al. The patent describes deploying air-dropped buoys for use as calibrated targets for a system which images submerged objects. The calibrated optical buoys may be deployed by a helicopter.

U.S. Pat. No. 5,264,905 to Cavanagh et al. describes automated test equipment that overcomes many of the concerns with the conventional calibration process. A portion of an output beam from a laser rangefinder is directed to an inlet port of an integrating sphere which disperses the beam for exit through two outlet ports. The first outlet port is connected to a radiometer for measuring the dispersed energy. This measurement is used to determine the energy output of the laser rangefinder. The second outlet port communicates with an avalanche photo diode (APD) that detects the pulse envelope of the laser beam. The pulse envelope is connected in parallel to two separate measuring circuits for determining the pulse width and the pulse interval. A third connection from the APD is made to a pulse delay generator which generates a delayed trigger signal. The delayed trigger signal is input to a laser diode that generates a laser pulse to simulate the return of backscattered energy to the laser rangefinder. The laser pulse that is generated by the laser diode is directed to the integrating sphere for return to the laser rangefinder. The duration of the time interval between the sending of the signal from the laser rangefinder to the reception of the artificially generated return signal is calculated and used as the basis for calibrating the LIDAR apparatus. The pulse delay generator is programmable, so that the time interval can be adjusted to provide a more thorough calibration.

The automated test equipment of Cavanagh et al. overcomes many of the concerns associated with the conventional calibration process. The automated test equipment may be used indoors and requires less space. The laser diode that is triggered to simulate a return signal has sufficient intensity to be reliably detected by the laser rangefinder. However, in calibration of a LIDAR velocity measurement system, as previously noted, the simulated signal must be coherent with the frequency shifted by only a small fraction from the center frequency of the LIDAR transmitter. A triggered laser diode as described by Cavanagh et al. does not possess the required coherence, nor a center frequency that is close enough to the transmitter center frequency to accomplish a velocity calibration. In addition, in some calibration operations, a strong signal return such as that provided by a triggered laser diode may not be desirable. For example, if the LIDAR apparatus is to be used to measure atmospheric parameters, such as wind velocity or wind velocity distribution, accurate calibration may not be achieved when the return signal from a hard target or the laser diode of Cavanagh et al. is many orders of magnitude higher than the return signal that will be received in the actual application. This is because, in the practical application, the return light signal is the low level backscattered light from small aerosol particles entrained in the air, at some distance from the receiver. The receiver optics and electronics are optimized to detect these small levels, and could be saturated or damaged by very high signal levels. In addition, because the actual signal levels are so low, it is customary to employ signal pulse accumulation over many hundreds of successive output pulses, followed by sophisticated signal processing circuits and software to extract the velocity information. The high level signals provided by hard targets or triggered laser diodes do not allow the "end-to-end" testing of the receiver system through the signal processing electronics and software.

Another concern in the Cavanagh et al. approach is that the calibration of the laser rangefinder is dependent upon the proper calibration of the automated test equipment. For example, if the pulse delay generator is improperly calibrated, the laser rangefinder will be inaccurately calibrated. There must also be a precise time-compensation for the delays caused by the electrical operations that occur for artificially generating the return light signal. The return light signal is generated by the equipment only after operation of the APD, the pulse delay generator, and the laser diode.

U.S. Pat. No. 5,825,464 to Feichtner solves most of the previous calibration problems by providing a physical fiberoptic delay line with an integrating sphere input to the LIDAR receiver that uses the actual laser output from the LIDAR transceiver. This device only generates one dimensional range data.

None of the previous systems are capable of providing a true series of two dimensional range gate images to simulate a three dimensional LIDAR object.

What is needed is a system and method for calibrating and testing a light-emitting apparatus for detecting remote three dimensional objects by means of backscattered light, with the system and method being applicable to achieving thorough calibration over a wide range of return light signal strengths as well as simulating static and dynamic target conditions.

SUMMARY OF THE INVENTION

This disclosure is directed to systems and methods for calibrating light detection and ranging (LIDAR) units that solve one or more of the problems discussed above. In one particular embodiment, a calibration system and method including displaying multiple simulated two dimensional images sequentially into a flash light detection and ranging (LIDAR) unit under test. Multiple two dimensional images are generated (e.g., from software), each simulating a range gate plane. Each range gate plane image is illuminated by a high speed light source (e.g. Q-switched laser) in the appropriate sequence. All of the sequenced images are multiplexed into a single optical channel via a light tube and directed into the optical input of the flash LIDAR unit under test. The multiple two dimensional range gate images are perceived as a solid object at some distance and orientation by the flash LIDAR unit under test. The simulations of the presence and movement of remote objects are used to calibrate the apparatus.

One embodiment comprises a system for calibrating a Light Detection and Ranging (LIDAR) unit. In this embodiment, the system includes a light pulse detection unit, a delay unit and a two-dimensional target. The light pulse detection unit is configured to receive a light pulse from the LIDAR unit. The delay unit is coupled to the light pulse detection unit and is configured to produce one or more delayed light pulses which are delayed by a known interval from the light pulse received from the LIDAR unit. The delayed light pulses produced by the delay unit are used to illuminate the target. Target illumination from each of the delayed light pulses returns to the LIDAR unit with a corresponding known delay. The delay of each delayed light pulse simulates a range that is greater than the actual physical distance from the LIDAR unit to the target. The delay of the light pulses from different parts of the target may be different to simulate different ranges for the different parts of the target.

In one embodiment, the delay unit comprises a length of optical fiber that transmits the light pulse from the LIDAR unit to the target or to optical splitters and subsequent optical fibers that can produce multiple delayed light pulses. In another embodiment, the delay unit comprises an electronic controller that is triggered by the light pulse from the LIDAR unit and then controls a light source to generate the delayed light pulses at known intervals after being triggered by the light pulse from the LIDAR unit. The electronic controller may alternatively control one or more optical shutters to effectively produce the delayed light pulses. The electronic controller may also be configured to control a light source to scan a beam across entrance apertures of a linear array of optical fibers that carry corresponding light pulses to the target. The beam may be a linearly expanded beam, and the angle between the linearly expanded beam and the linear array of entrance apertures may be adjustable to vary the range gate delay between light pulses of successive ones of the optical fibers.

The target may be a physical object having three dimensions that can be illuminated by a single pulse of light, or it may be a two-dimensional target that can be illuminated by multiple pulses of light that are separated by range gate delays. The two-dimensional target may present a plurality of target images that are combined by an optical modulator to be presented as a single image to the LIDAR unit. The target images may be produced by passing the light pulses through transparencies or through two-dimensional optical modulators. The optical modulators may be transmissive or reflective modulators. A lens may be provided between the target and the LIDAR unit to adjust the field of view of the target as presented to the LIDAR unit.

Another embodiment comprises a method for calibrating a LIDAR unit. The method includes emitting a light pulse from the LIDAR unit, receiving the light pulse from the LIDAR unit in a light pulse detection unit, generating one or more delayed light pulses, where each of the delayed light pulses is delayed by a corresponding known interval from the light pulse received from the LIDAR unit, illuminating a two-dimensional target with the delayed light pulses, receiving target illumination from each of the delayed light pulses at the LIDAR unit with a corresponding known delay, and adjusting a range calibration of the LIDAR unit based on the known delay corresponding to each of the delayed light pulses.

Numerous alternative embodiments are possible.

BRIEF DESCRIPTION OF THE DRAWINGS

Other objects and advantages of the invention may become apparent upon reading the following detailed description and upon reference to the accompanying drawings.

Figure 1:
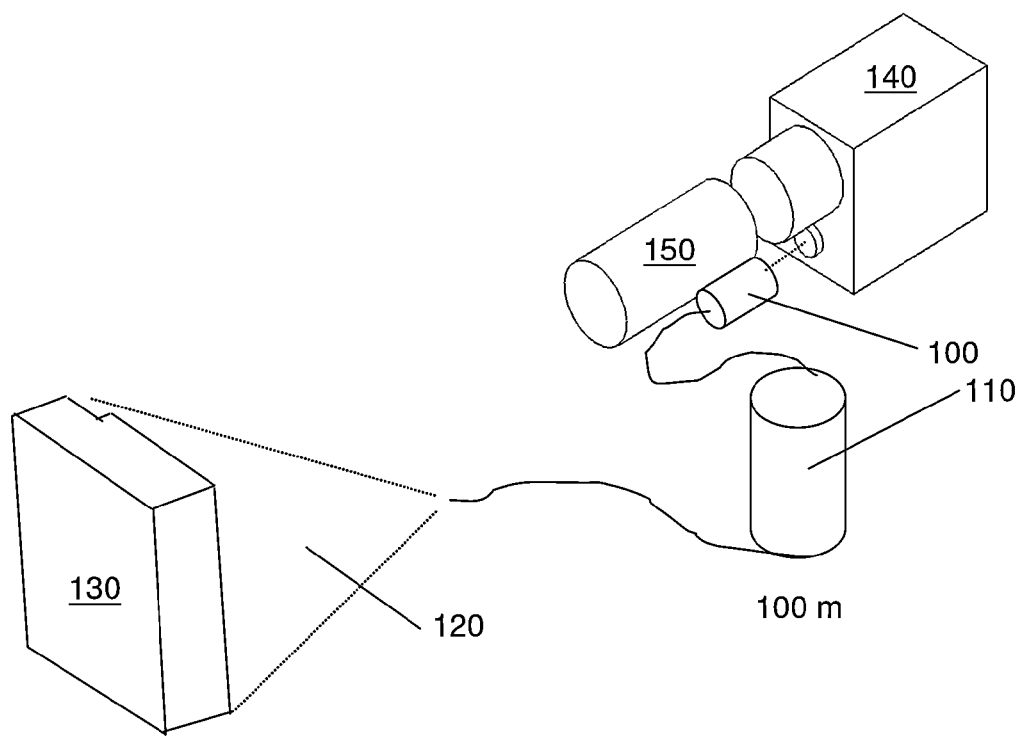
FIG. 1 is a schematic diagram of a calibration system for a light-emitting detection apparatus, in accordance with a first embodiment of the invention.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

A first embodiment of a calibration system and method includes collecting a light pulse as emitted from a flash LIDAR unit, transmitting the pulse through a known length of optical fiber to simulate a known delay length, projecting the transmitted light onto a fixed or moving target of known dimensions and permitting the flash LIDAR unit to collect the reflected light. This calibration system is suitable for calibrating a flash LIDAR unit with any given target (e.g. fixed, moving and/or rotating) and shortened physical range length (as compared to the gross range delay length). A lens on the receiver of the flash LIDAR unit can simulate the field of view at the distance equivalent to the gross delay length. The lens can be a zoom lens, so that the field of view occupied by the target can be adjusted. This calibration system has the advantage of providing precise time delays, hence precise path lengths, and requires no power for operation. It is possible to rotate or oscillate the flash LIDAR unit and/or the target to test the dynamic properties of the flash LIDAR unit. This system has the advantage of reducing the test range length to a reasonable size (e.g. to fit within a building) but still has the disadvantage of requiring a life size target for accurate range gate information.

Another embodiment of a calibration system and method includes collecting a light pulse as emitted from a flash LIDAR unit, waiting a specified delay time, triggering a high speed light source to generate a light pulse, projecting the delayed light pulse on a fixed or moving target of known dimensions and permitting the flash LIDAR unit to collect the reflected light. This calibration system is suitable for calibrating a flash LIDAR unit with any given target (e.g. fixed, moving and/or rotating) and shortened physical range length compared to the gross range delay length. The system can have variable gross range delay length because it generates the delayed light pulse that illuminates the target. A lens on the flash LIDAR unit can simulate the field of view at the distance equivalent to the gross delay length. This system has the advantage of providing variable gross time delays, hence variable gross delay lengths. It is possible to rotate or oscillate the flash LIDAR unit and/or the target to test the dynamic properties of the flash LIDAR unit. This system has the advantage of reducing the test range length to a reasonable size (e.g. to fit within a building) and eliminates the need for a long length of optical fiber to provide the gross delay length, but still has the disadvantage of requiring a life size target for accurate range gate information.

Another embodiment of the calibration system and method includes collecting a light pulse as emitted from a flash LIDAR unit, transmitting the pulse through known lengths of optical fiber optical splitters to simulate multiple known delay lengths, optically modulating the resulting pulses and returning them through an optical multiplexer to the receiver of the flash LIDAR unit, thus presenting the flash LIDAR unit with two dimensional images at various range gates. The system thereby presents n range gate images to the flash LIDAR receiver, each with a specific two dimensional intensity modulated image representing a single range gate reflection and presented in sequence with the respective range gate time delays. This calibration system is suitable for calibrating a flash LIDAR unit with a fixed set of range gates and fixed gross range delay length. This system has the advantage of providing precise time delays, hence gross delay lengths, it is small and portable, and it requires no power for operation. It is possible to rotate or oscillate the entire optical system to present a moving target to the flash LIDAR system to test dynamic properties. The transmissive (or reflective) optical modulator can be a fixed set of transparencies or it can be an active imaging optical modulator, such as a transmissive LCD array or a reflective array of micromirrors (e.g. Texas Instruments DMD). Computer generated range gate images can provide real-time simulated targets to the flash LIDAR device. One advantage of an active optical modulator is that it can generate a moving image to test dynamic qualities of the flash LIDAR unit without physically moving the optical system.

A further embodiment of the calibration system and method includes collecting a light pulse as emitted from a flash LIDAR unit, waiting a specified delay time, triggering a high speed light source to generate a light pulse, optically modulating this light pulse, passing the modulated pulse through an optical multiplexer and returning it to the receiver of the flash LIDAR unit, thus presenting the flash LIDAR unit with a first range gate two dimensional image. This is repeated at further specified delay times (e.g., 0.1% of the gross delay length) to present additional two dimensional range gate images to the flash LIDAR receiver, each with a specific two dimensional intensity modulated image representing a single range gate reflection and presented in sequence with the respective range gate time delay. The optical multiplexer can be of the light tube type as described by Scott, et al in U.S. Pat. No. 2,887,935 or Pritchard in U.S. Pat. No. 3,170,980. This calibration system is suitable for calibrating a flash LIDAR unit with a variable set of range gates and variable gross range delay length. The system has the advantage of providing variable time delays, hence variable path lengths. The transmissive (or reflective) optical modulator can be a fixed set of transparencies or an active imaging optical modulator, for example a transmissive LCD array or a reflective array of micromirrors (e.g. Texas Instruments DMD). The optical modulator array refresh rate is only a function of the frame refresh rate of the flash LIDAR unit (e.g. typically $\frac{1}{30}$th of a second), which is well within the capability of existing hardware. Computer generated range gate images can provide real-time simulated targets to the flash LIDAR device. The advantage of an active optical modulator is that it can simulate a moving image to test dynamic qualities of the flash LIDAR unit without physically moving the optical system. The system can simulate the entire working range of any flash LIDAR system and provide an effective simulation tool for integrated systems testing apparatus (e.g. the incorporation of a flash LIDAR unit under test in a vehicle guidance package).

A further embodiment of the calibration system and method includes collecting a light pulse as emitted from a flash LIDAR unit, waiting a specified delay time, triggering a high speed light source to generate a light pulse, directing the light pulse to a reflective modulator (e.g. a Texas Instruments DMD), passing the modulated image through an optical multiplexer and back to the receiver of the flash LIDAR unit, thus presenting the flash LIDAR unit with a first range gate two dimensional image. This is repeated at further specified delay times (e.g., 0.1% of the gross delay length) to present additional two dimensional range gate images to the flash LIDAR receiver, each with a specific two dimensional intensity modulated image representing a single range gate reflection and presented in sequence with the respective range gate time delay. This system can reduce to one third the number of two dimensional modulators utilized, since each micromirror in a Texas Instruments DMD modulator array has three possible positions, each micromirror modulator array employing three individual light sources projecting at the DMD array at the appropriate angles. Since the pixels in a flash LIDAR system will occlude any further reflected images on that pixel area, there is no chance of pixel overlap in such an arrangement. The optical multiplexer can be of the light tube type as described by Scott, et al in U.S. Pat. No. 2,887,935 or Pritchard in U.S. Pat. No. 3,170,980. This calibration system is suitable for calibrating a flash LIDAR unit with a variable set of range gates and variable gross range delay length. The system has the advantage of providing variable time delays, hence variable path lengths. The reflective optical modulator can be a fixed set of reflectors or an active imaging optical modulator (e.g. Texas Instruments DMD). The optical modulator array refresh rate is only a function of the frame refresh rate of the flash LIDAR unit (e.g. typically $\frac{1}{30}$th of a second), which is well within the capability of existing hardware. Computer generated range gate images can provide real-time simulated targets to the flash LIDAR device. The advantage of an active optical modulator is that it can generate a moving image to test dynamic qualities of the flash LIDAR unit without physically moving the optical system. This system can simulate the entire working range of any flash LIDAR system and provide an effective simulation tool for integrated systems testing apparatus (e.g. the incorporation of a flash LIDAR unit under test in a vehicle guidance package).

A further embodiment of the calibration system and method includes collecting a light pulse as emitted from a flash LIDAR unit, waiting a specified delay time, triggering individual pixels in a high speed light modulator array to modulate a continuous light source that is returned to the receiver of the flash LIDAR unit, thus presenting a series of time and intensity modulated pixels to the flash LIDAR receiver. This calibration system is best implemented using an array of Pockels cells, each of which is capable of extremely high speed modulation of a continuous light source. The calibration system is suitable for calibrating a flash LIDAR unit with a variable set of range gates and variable gross range delay length. This system has the advantage of providing variable time delays, hence variable path lengths. Computer generated solid images can provide real-time simulated targets to the flash LIDAR device. The advantage of an active optical modulator is that it can generate a moving image to test dynamic qualities of the flash LIDAR unit without physically moving the optical system. The system can simulate the entire working range of any flash LIDAR system and provide an effective simulation tool for integrated systems testing apparatus (e.g. the incorporation of a flash LIDAR unit under test in a vehicle guidance package).

A further embodiment of the calibration system and method incorporates a scanned linear array of optical fibers that is analogous in function to an engine ignition distributor system. The light propagation path starts with a collector to receive a light pulse from a flash LIDAR unit. The light pulse is delayed by a fiber optic line or electronic control unit, then relayed to an optical scanner. The optical scanner passes a scan line over a linear array of optical fibers, each of which is in communication with a diffuser or collimator behind a corresponding range gate image. This diffused/collimated light illuminates the corresponding range gate image at the appropriate time. The velocity of the scan line and the spacing between each fiber determines the delay time between each fiber's output to the corresponding diffuser or collimator. A light (e.g., laser) source may be scanned with any optical scanner (preferably an acoustooptic scanner). The scanner is triggered by the laser flash emitted from the flash LIDAR unit under test. The gross delay can be provided by an electronic delay means between the laser flash detector and the acoustooptic scanner or by the laser scanner itself. The laser scanner can provide the gross delay by simply starting the scan of the optic fiber array some desired angular distance ahead of the start of the linear array of optical fibers. This will provide any given delay time, so long as the scanner has the capability of providing a wide enough scan duration to cover the sum of the desired delay times. The short range gate delay times are provided by the spacing between the optical fibers. The range gate delay times may be varied by varying the spacing between the optical fibers or by changing the velocity of the scan line. This can be done by passing an expanded beam (i.e. a scanned line) across a linear array of optical fibers where the linear array of optical fibers is capable of rotating perpendicular to the scan path of the line beam. The spacing between each optical fiber will vary as a cosine function and is controlled (assuming a constant velocity scan) by simply rotating the linear array of optical fibers. This system also has the advantage of tailoring the light pulse temporal shape as it scans past each optical fiber entrance aperture. For example, a Gaussian pulse is simply provided by scanning a Gaussian distributed beam across the optical fiber entrance aperture. The duration of the Gaussian pulse is a function of the scanning velocity and the width of the optical fiber entrance aperture.

One advantage of the various embodiments of the invention is that the systems are compact and do not require a lengthy testing range in order to calibrate a LIDAR apparatus that bases range determinations for remote objects upon received backscattered light. The system uses fiberoptic delay lines which are lengthy, but can be coiled to minimize the required space. Another advantage of the embodiments described herein is that a fine optical alignment of the calibration equipment with the apparatus of interest is not required. Moreover, these embodiments minimize the amount of laser radiation that is propagated into a test area. In fact, the system is sufficiently compact to enclose the entire system in a light-tight container, eliminating the danger of eye exposure to laser radiation.

Another advantage of the described embodiments is that they do not require propagation of the LIDAR signal through the atmosphere, so the calibration operation is immune to weather disturbances and can accurately simulate space vacuum conditions. The described approaches can be used to simulate a collection of targets at different ranges, without the need to set up a target at each range of interest. These approaches can also be used to simulate Doppler target returns.

One of the more important advantages of various embodiments of the invention is that the systems and methods can be used to provide "end-to-end" testing of the equipment and the signal processing hardware and software of a flash LIDAR apparatus using passively backscattered signal returns that closely simulate the real application, especially those applications and situations where the return is so small that signal pulse accumulation techniques must be employed. As an example, in applications such as wind distribution measurements, the return light signal is a weak signal. The data for calculating wind are acquired by detecting backscattering from aerosol particles. To provide reliable calculations, the signal processing algorithms of the flash LIDAR apparatus may accumulate returned signals from successive pulses until an accumulative signal has sufficient strength for reliable signal processing. If a calibration system provides only strong return signals, the signal accumulation operation will not be tested. However, the present invention can control the amplitude of return light signals in the same manner that the incoming beam from the LIDAR apparatus arrives. The control of the return light signals ensures that the front-end signal process is adequately tested.

FIG. 1 illustrates a first embodiment of a calibration system and method.

The system and method include collecting a light (e.g., laser) pulse as emitted from a flash LIDAR unit through connector 100. The pulse is transmitted through a known length (e.g., 100 m) of optical fiber 110 to simulate a known delay length. This is termed the gross delay length. The transmitted light 120 is projected onto a fixed or moving target 130 of known dimensions. The light which is reflected from target 130 returns to the flash LIDAR unit 140, which collects the reflected light. This system is suitable for calibrating a flash LIDAR unit with any given target 130, which can be fixed, moving and/or rotating. The gross range delay length is relatively fixed. A lens 150 on the flash LIDAR unit can simulate the field of view at the distance equivalent to the gross delay length. The lens can be a zoom lens, so that the field of view occupied by the target can be adjusted. This system has the advantage of providing precise time delays, hence precise path lengths. The system requires no power for operation. It is possible to rotate or oscillate the flash LIDAR unit 140 and/or the target 130 to test the dynamic properties of the flash LIDAR unit 140. This system has the advantage of reducing the test range length to a reasonable size (e.g. to fit within a building) but still has the disadvantage of requiring a life size target 130 for accurate range gate information.

Figure 2:
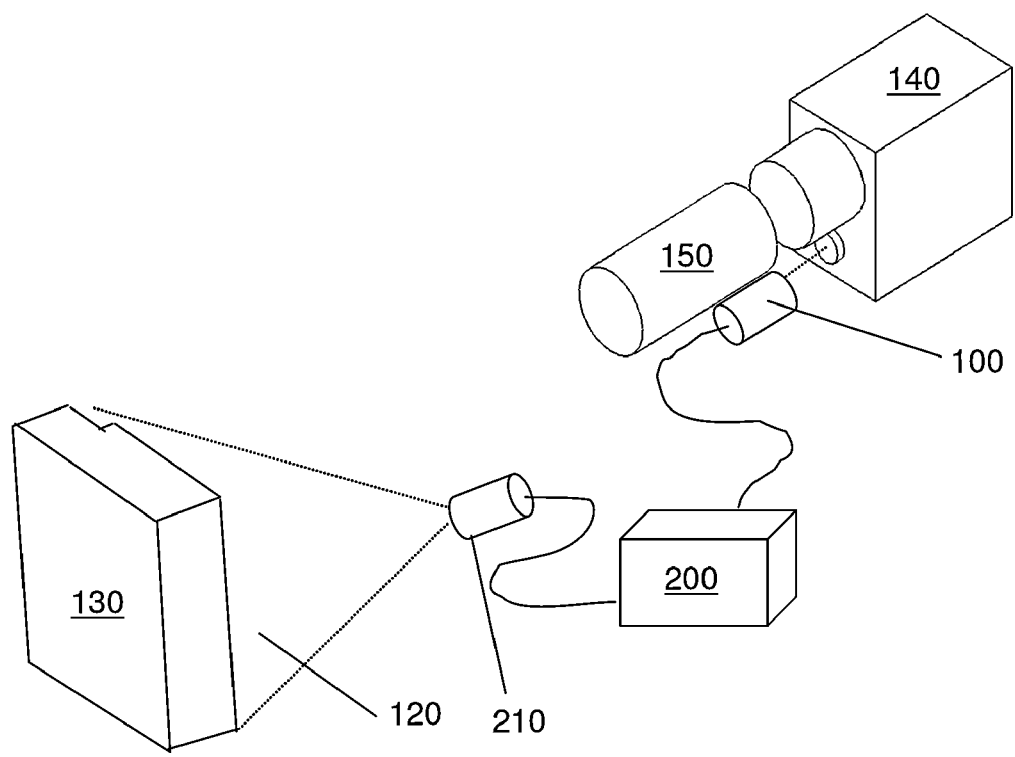
FIG. 2 is a schematic diagram of a calibration system for a light-emitting detection apparatus, in accordance with a second embodiment of the invention.

FIG. 2 illustrates a second embodiment of a calibration system and method that is similar to the embodiment of FIG. 1, but which uses an electronic delay instead of a fiberoptic delay. This embodiment begins with collecting, through connector 100, a light pulse that is emitted from a flash LIDAR unit. After waiting a specified delay time (i.e. the gross delay length), an electronic delay unit 200 triggers a high speed light source 210 to generate a light pulse 120. Delayed light pulse 120 is projected on a fixed or moving target 130 of known dimensions. The reflected light is collected by flash LIDAR unit 140. This calibration system is suitable for calibrating a flash LIDAR unit 140 with any given target 130 (e.g. fixed, moving and/or rotating) and can have a variable gross range delay length. A lens 150 on the flash LIDAR unit 140 can simulate the field of view at a distance equivalent to the gross delay length. This system has the advantage of providing variable gross time delays, hence variable gross delay lengths. It is possible to rotate or oscillate the flash LIDAR unit 140 and/or the target 130 to test the dynamic properties of the flash LIDAR unit 140. This system has the advantage of reducing the test range length to a reasonable size (e.g. to fit within a building) and eliminates the need for a long length of optical fiber to provide the gross delay length, but still has the disadvantage of requiring a life size target for accurate range gate information.

Figure 3:
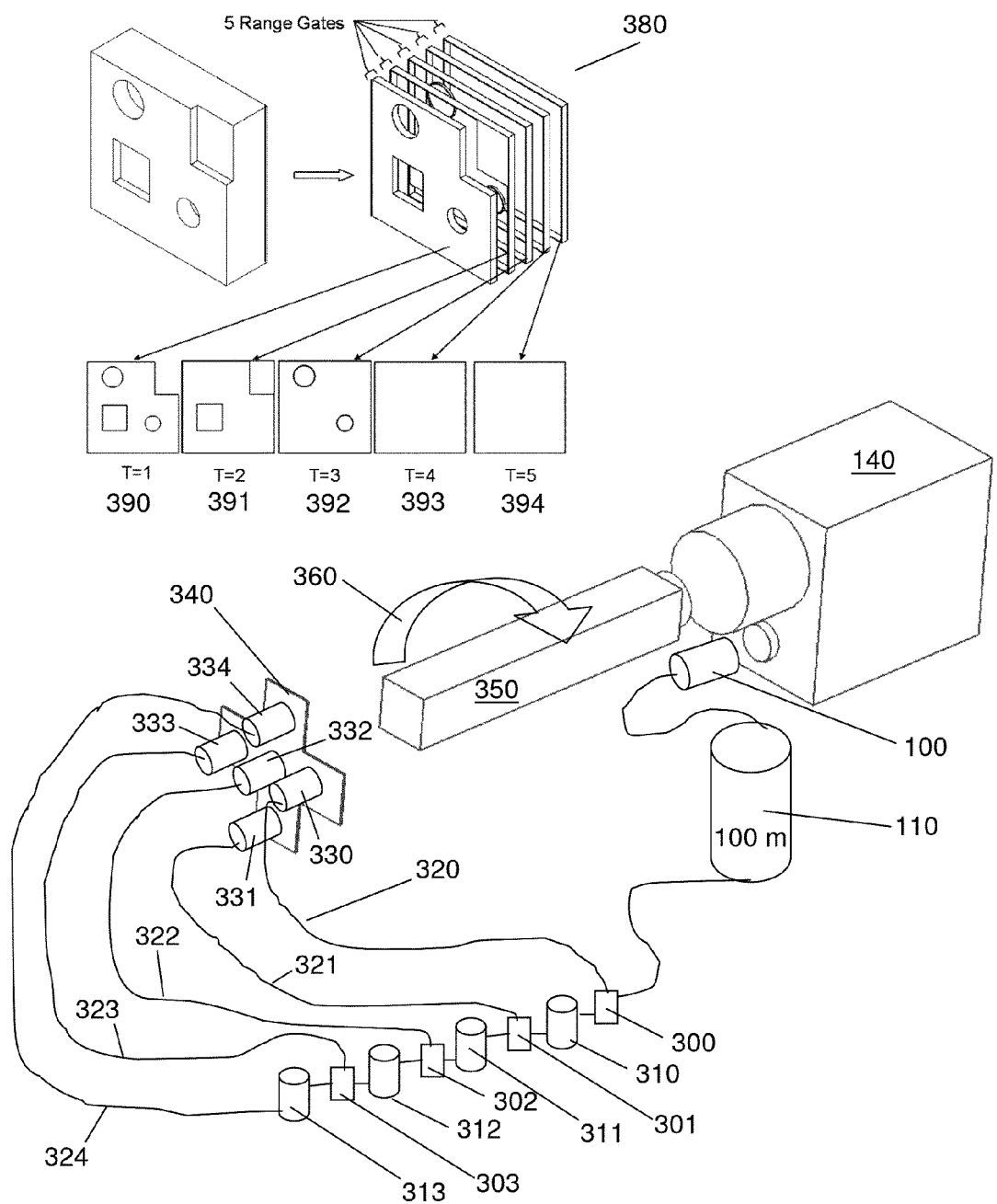
FIG. 3 is a schematic diagram of a calibration system for a light-emitting detection apparatus, in accordance with a third embodiment of the invention.

FIG. 3 illustrates a third embodiment of the calibration system and method which again begins with collecting, through connector 100, a light pulse that is emitted from a flash LIDAR unit. The pulse is transmitted through a known length (e.g., 100 m) of optical fiber 110 to simulate a known delay length (the gross delay length). The pulse is then passed through several optical splitters and additional delay lines to produce several range gate images. As depicted in FIG. 3, the pulse first passes through optical splitter 300. A portion of the pulse is transmitted through optical fiber 320 to a first light diffuser 330. Another portion of the pulse is transmitted through optical fiber 310 to a second optical splitter 301. A portion of the pulse from optical splitter 301 is transmitted through optical fiber 321 to a second light diffuser 331, while another portion of the pulse is transmitted through optical fiber 311 to a third optical splitter 302. A portion of the pulse from optical splitter 302 is transmitted through optical fiber 322 to a third light diffuser 331. Another portion of the pulse is transmitted through optical fiber 312 to a fourth optical splitter 303. A portion of the pulse from optical splitter 303 is transmitted through optical fiber 323 to a fourth light diffuser 333, and another portion of the pulse is transmitted through optical fiber 313 to a fifth light diffuser 334. Optical fibers 310-313 and 320-324 are known lengths of optical fiber which represent range gate delays (e.g., each being 0.1% of the gross delay length). Light diffusers 330-334 therefore provide successively delayed pulses of light The light emitted from optical diffusers 330-334 passes through a transmissive optical modulator 340. The light could alternatively be reflected off a reflective modulator. As depicted in FIG. 3, transmissive optical modulator 340 consists of five fixed transparencies with images 390-394. As illustrated in FIG. 3, there are five range gate two dimensional images (390-394) that are derived from slices 380 of target 370. Optical modulator 340 consists of these five images in transparency form. Each of the transparencies is positioned in front of a corresponding one of the optical diffusers. For example, the transparency with image 390 is positioned in front of optical diffuser 330, the transparency with image 391 is positioned in front of optical diffuser 331, and so on. The light emitted from transmissive optical modulator 340 passes through an optical multiplexer 350 and back to the receiver of the flash LIDAR unit 140. In this embodiment, optical multiplexer 350 is a light tube. The optical multiplexer effectively overlaps the images from the different transparencies at the receiver of the flash LIDAR unit, thus presenting the flash LIDAR unit with a first range gate two dimensional image 390, a second range gate two dimensional image 391, and so on. Each of these images has a specific two dimensional intensity modulated image that represents a single range gate reflection and is presented in sequence with the respective range gate time delay.

This calibration system is suitable for calibrating a flash LIDAR unit with a fixed set of range gates and fixed gross range delay length. This system has the advantage of providing precise path lengths, hence precise time delays. The system is also small and portable, and requires no power for operation. It is possible to oscillate or rotate the entire optical system (at least optical multiplexer 350, modulators 340 and diffusers 330 (as illustrated by arrow 360) to present a moving target to the flash LIDAR system 140 to test dynamic properties. The transmissive (or reflective) optical modulators 340 can be a fixed set of transparencies or an active imaging optical modulator (e.g., a transmissive LCD array or a reflective array of micromirrors such as a Texas Instruments DMD). Computer generated range gate images (e.g. 390-394) can provide real-time simulated targets to the flash LIDAR device 140. The advantage of an active optical modulator 340 is that it can generate a moving image to test dynamic qualities of the flash LIDAR unit 140 without physically moving the optical system.

Figure 4:
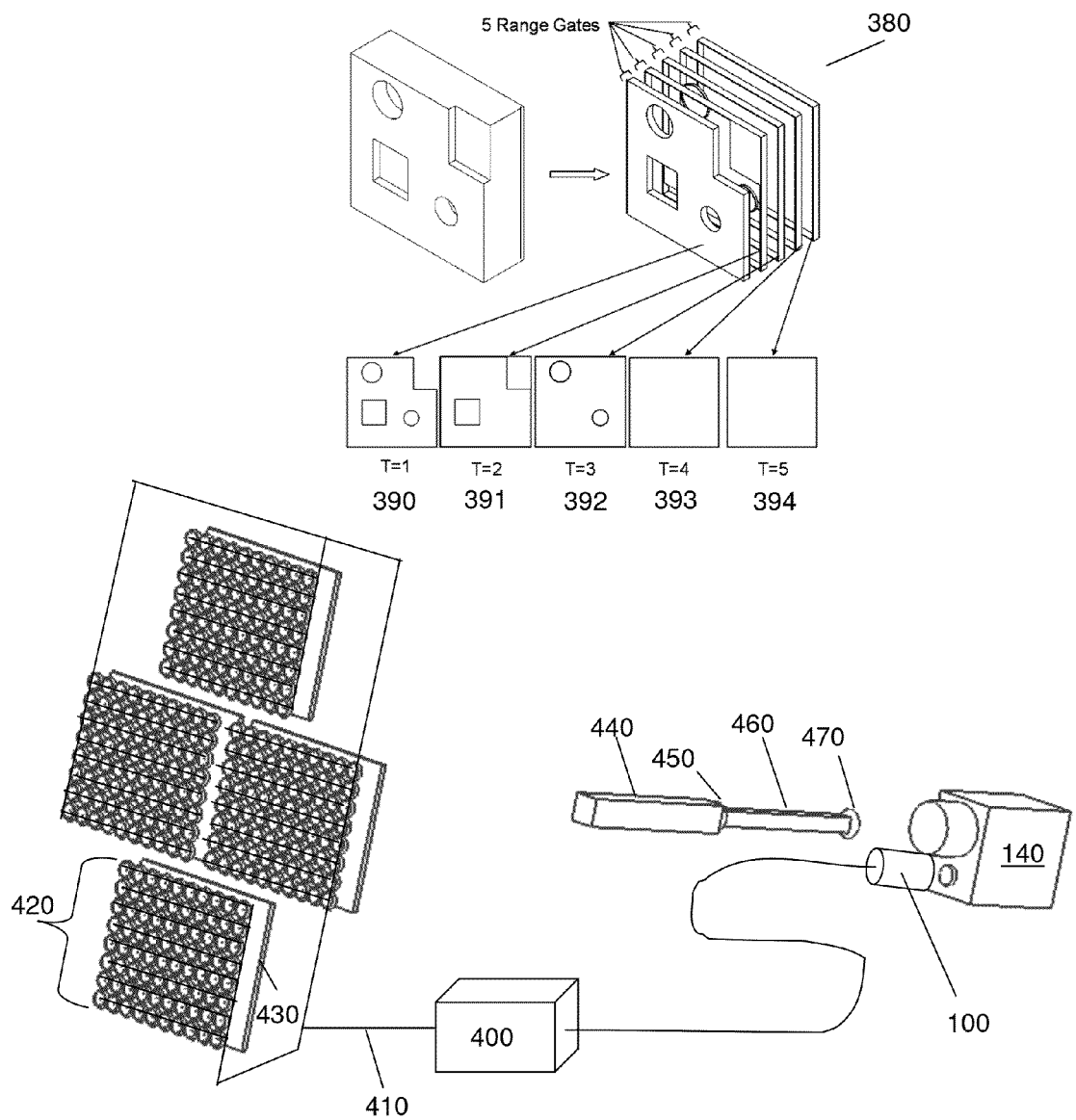
FIG. 4 is a schematic diagram of a calibration system for a light-emitting detection apparatus, in accordance with a fourth embodiment of the invention.

FIG. 4 illustrates a fourth embodiment of the calibration system and method. In this embodiment, a light pulse as emitted from a flash LIDAR unit 140 is collected by connector 100. After waiting for a specified delay time (i.e. the gross delay length) electronic delay unit 400 triggers a high speed light source 400 (e.g., laser unit) to generate a light pulse equivalent to the pulse emitted from flash LIDAR unit 140. Electronic delay unit 400 can trigger a high speed light source to generate one or more light pulses to simulate returns from one or more ranges. These light pulses are transmitted through a distribution system 410 (e.g., a bundle of optical fibers) to a set of optical shutters (e.g. 420), which switch the light pulses. The switched light pulses pass through a transmissive optical modulator (e.g., 430), or are reflected off a reflective modulator. The switched and modulated light pulses then pass through an optical multiplexer (components 440, 450, 460 and 470) and are returned to the receiver of the flash LIDAR unit 140.

In one embodiment, the optical shutters may be Pockels cells. As illustrated in FIG. 4, the optical shutters include four arrays of 80 Pockels cells each. In the embodiment of FIG. 4, the transmissive optical modulators include four arrays of 80 separate 128×128 pixel arrays. The optical multiplexer combines the images from the different pixel arrays of the optical modulator in the same manner as discussed above. The optical multiplexer (components 440, 450, 460 and 470) can be, for example, of the type as described by Scott, et al. in U.S. Pat. No. 2,887,935 or by Pritchard in U.S. Pat. No. 3,170,980. As illustrated in FIG. 4, the optical system is similar to the Pritchard system where a first light tube 440, a relay lens 450, a second light tube 460 and an objective lens 470 act together to multiply the number of images created by one light tube by the number of images created by the other light tube. For example, if the first light tube (440) produces 13 images and the second light tube (460) produces 41 images, the total number of images produced by the system is 41×13=533 images. Relay lens 450 permits this function.

The system presents the flash LIDAR unit 140 with a first range gate two dimensional image (e.g. 390), waits a further specified range gate delay time (for example, 0.1% of the gross delay length), triggers another high speed shutter in array 420 to generate a light pulse and transmit this light pulse through an image (e.g., 391), and so on. These images are combined by the optical multiplexer and returned to the receiver of the flash LIDAR unit 140, thus presenting n range gate two dimensional images (e.g. the five range gate images 390-394) to the flash LIDAR receiver. Each image has a specific two dimensional intensity modulated image representing a single range gate reflection and is presented in sequence with the respective range gate time delay.

The calibration system of FIG. 4 is suitable for calibrating a flash LIDAR unit 140 with a variable set of range gates and variable gross range delay length. This system has the advantage of providing variable time delays, hence variable path lengths. The transmissive (or reflective) optical modulator array 430 can be a fixed set of transparencies or an active imaging optical modulator, such as a transmissive LCD array or a reflective array of micromirrors (e.g. Texas Instruments DMD). The optical modulator array 430 refresh rate is only a function of the frame refresh rate of the flash LIDAR unit 140 (e.g. typically $\frac{1}{30}$th of a second), which is well within the capability of existing hardware. Computer generated range gate images (e.g. 390-394) can provide real-time simulated targets to the flash LIDAR device 140. The advantage of an active optical modulator array 430 is that it can generate a moving image to test dynamic qualities of the flash LIDAR unit 140 without physically moving the optical system. This system can simulate the entire working range of any flash LIDAR system and provide an effective simulation tool for integrated systems testing apparatus (e.g. the incorporation of a flash LIDAR unit under test in a vehicle guidance package).

Figure 5:
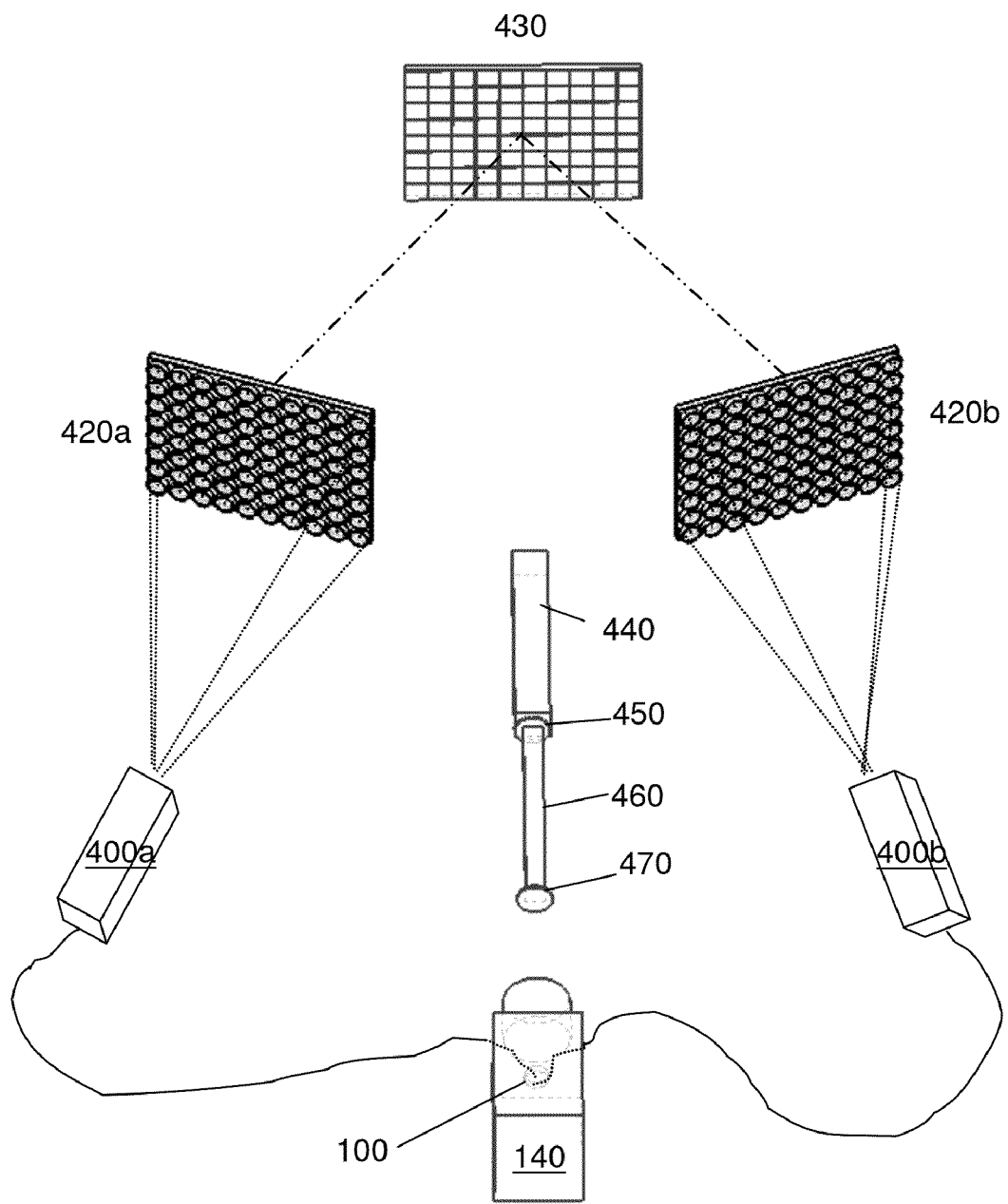
FIG. 5 is a schematic diagram of a calibration system for a light-emitting detection apparatus, in accordance with a fifth embodiment of the invention.

FIG. 5 illustrates a fifth embodiment of the calibration system and method. In this embodiment, a light pulse as emitted from a flash LIDAR unit 140 is collected through a connector as described above. After a specified delay time (i.e. the gross delay length), high speed light sources 400a and 400b are triggered to generate a light pulse equivalent to the pulse emitted from flash LIDAR unit 140. This light pulse is transmitted through a series of optical shutters 420a and 420b, switching the light pulse. The optical shutters may, for example, be Pockels cells. In this embodiment, two arrays of 80 Pockels cells with lenses are used to direct the shuttered light beam to an individual array area on optical modulator 430. The light sources and shutters are positioned at a specific angle from reflective optical modulator 430 (e.g. a Texas Instruments DMD), reflecting the images through an optical multiplexer (components 440, 450, 460, and 470 as described earlier) and back to the receiver of the flash LIDAR unit 140.

Reflective optical modulator 430 switches back and forth to reflect either the image from optical shutters 420a or the image from optical shutters 420b to the optical multiplexer. In this manner, the flash LIDAR unit is presented with a first range gate two dimensional image, then after a specified delay time (a range gate delay of, e.g., 0.1% of the gross delay length), a second range gate two dimensional image, and so on, until n range gate images have been presented to the flash LIDAR receiver 140. Each image has a specific two dimensional intensity modulated image representing a single range gate reflection and is presented in sequence with the respective range gate time delay.

This system can cut in half the number of two dimensional modulators 430 utilized, since each micromirror in a Texas Instruments DMD modulator array has two possible positions, hard left or hard right. Each micromirror modulator array 430 can employ two individual light sources 400 projecting at the DMD array 430 at the appropriate angles 500 and 510. Since the pixels in a flash LIDAR system will respond to the initial images with which they are presented and occlude any further reflected images on that pixel area, there is no chance of pixel overlap in such an arrangement.

This system is suitable for calibrating a flash LIDAR unit with a variable set of range gates and variable gross range delay length. This embodiment has the advantage of providing variable time delays, hence variable path lengths. The reflective optical modulator 430 can be a fixed set of reflectors or an active imaging optical modulator (e.g. Texas Instruments DMD). The optical modulator array 430 refresh rate is only a function of the frame refresh rate of the flash LIDAR unit 140 (e.g. typically 1/30th of a second), which is well within the capability of existing hardware. Computer generated range gate images can provide real-time simulated targets to the flash LIDAR device. The advantage of an active optical modulator is that it can generate a moving image to test dynamic qualities of the flash LIDAR unit without physically moving the optical system. The system as described can simulate the entire working range of any flash LIDAR system and provide an effective simulation tool for integrated systems testing apparatus (e.g. the incorporation of a flash LIDAR unit under test in a vehicle guidance package).

Figure 6:
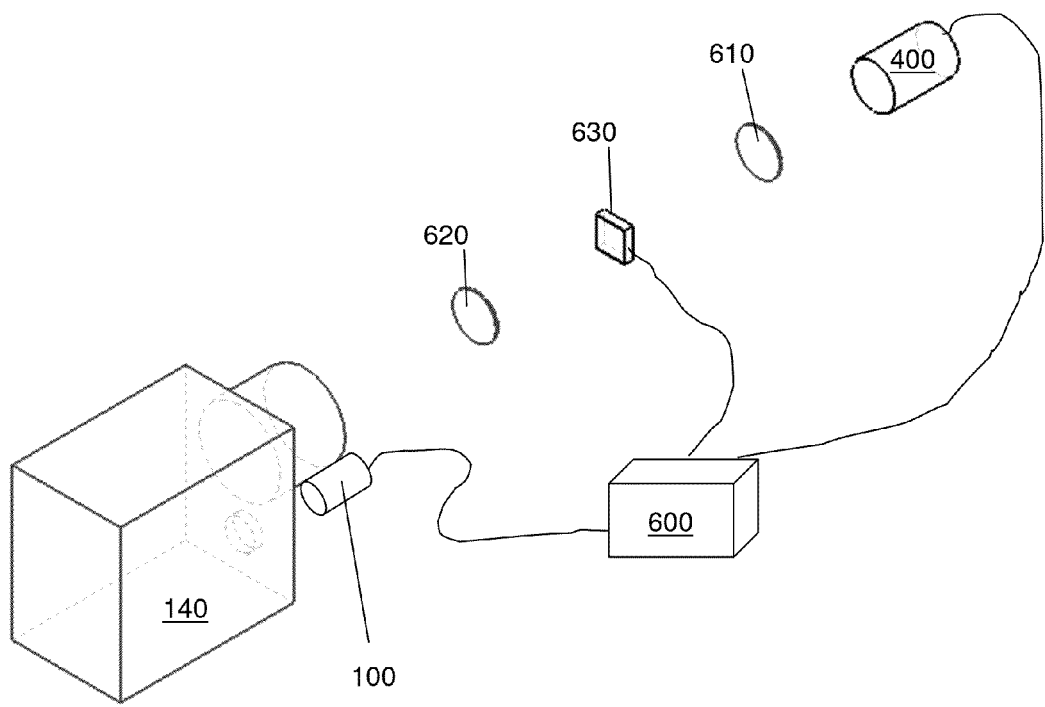
FIG. 6 is a schematic diagram of a calibration system for a light-emitting detection apparatus, in accordance with a sixth embodiment of the invention.

FIG. 6 illustrates a sixth embodiment of the calibration system and method. In this embodiment, a light pulse as emitted from a flash LIDAR unit 140 is collected through connector 100. After waiting a specified delay time (i.e. the gross delay length), individual pixels in a high speed light modulator array 630 (e.g. an array of micro Pockels or Kerr cells) are triggered to modulate a continuous light source 400 back to the receiver of the flash LIDAR unit 140 through lenses 610 and 620. In this manner, a series of time and intensity modulated pixels are presented to the flash LIDAR receiver 140. This calibration system is best implemented using an array of Pockels cells 630, each capable of extremely high speed modulation of a continuous light source 400. This calibration system is suitable for calibrating a flash LIDAR unit 140 with a variable set of range gates and variable gross range delay length. This system has the advantage of providing variable time delays, hence variable path lengths. Computer generated solid images can provide real-time simulated targets to the flash LIDAR device 140. The advantage of an active optical modulator array 630 is that it can generate a moving image to test dynamic qualities of the flash LIDAR unit 140 without physically moving the optical system. The system can simulate the entire working range of any flash LIDAR system 140 and provide an effective simulation tool for integrated systems testing apparatus (e.g. the incorporation of a flash LIDAR unit under test in a vehicle guidance package).

Figure 7A:
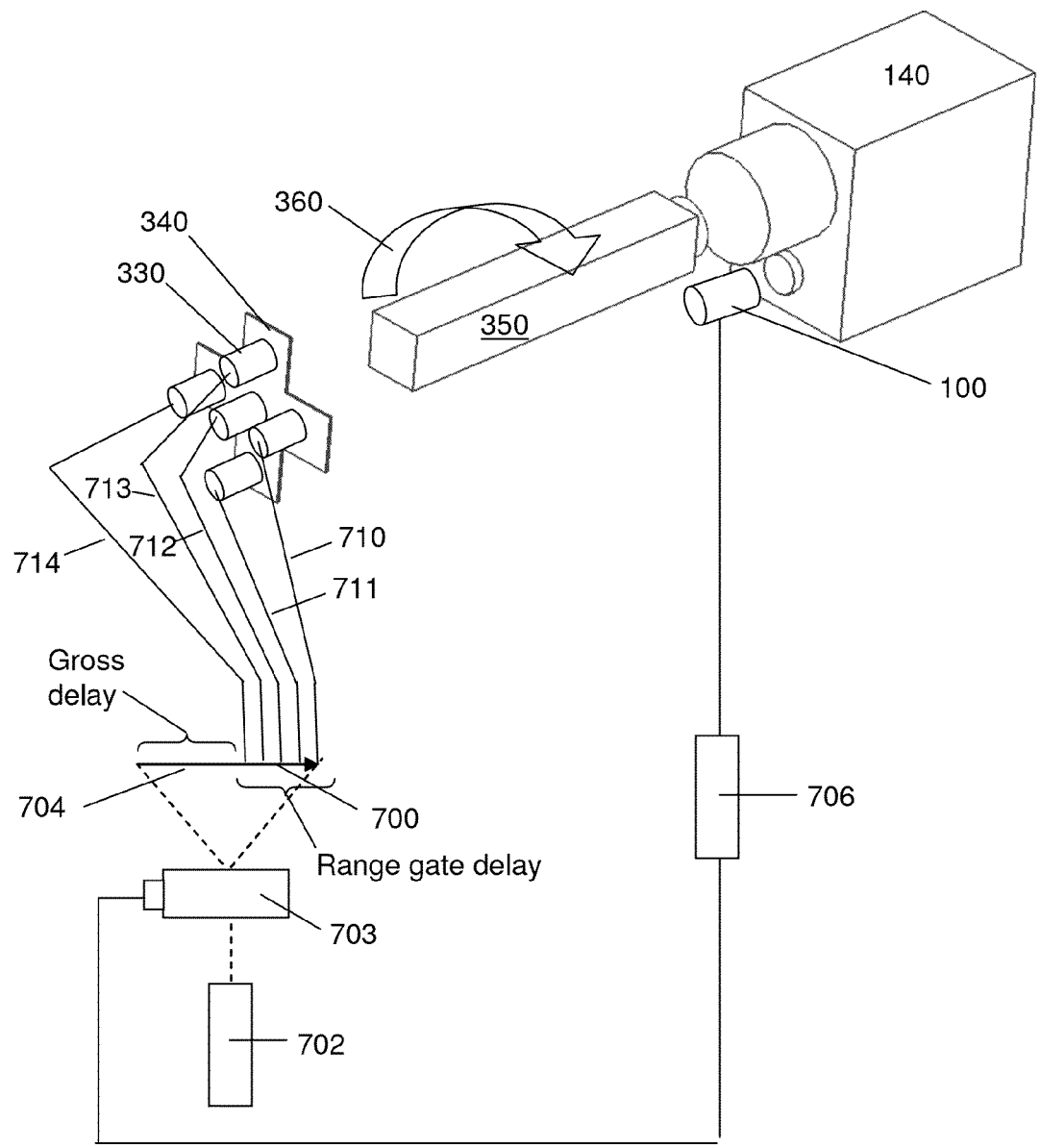
FIG. 7A is a schematic diagram of a delay line system for a light-emitting detection apparatus, in accordance with a seventh embodiment of the invention.

FIG. 7A illustrates a further embodiment of the calibration system and method. This embodiment incorporates a scanned linear array of optical fibers 710-714 that is analogous in function to an engine ignition distributor system. In this embodiment, a laser light source 702 is passed through an optical scanner 703. Initially, optical scanner 703 directs the laser light to an area (704) away from optical fibers 710-714. A light pulse as emitted from a flash LIDAR unit 140 is collected through connector 100. Optical scanner 703 is configured to wait a specified delay time (i.e. the gross delay length), and then scan the light from laser light source 702 across an area (707) in which the ends (fiber entrance aperture) of optical fibers 710-714 are positioned. The fiber entrance aperture of optical fibers 710-714 are configured as a linear array 700. As the light is scanned over the entrance aperture of each fiber, the light is communicated to the corresponding diffuser/collimator (e.g., 330). The light from the diffuser/collimator illuminates the corresponding range gate image 340. The range gate images are then passed through optical multiplexer 350 to the receiver of LIDAR unit 140.

The velocity at which the laser light is scanned across the entrance apertures of optical fibers 710-714 and the spacing between each fiber entrance aperture determines the delay time between each fiber's output to the diffusers/collimators. Laser source 702 may be scanned with any type of optical scanner. In one embodiment, it is scanned with an acoustooptic scanner. The acoustooptic scanner is triggered by the laser flash emitted from the flash LIDAR unit under test by collector 100. The gross delay period can be provided by fiberoptic or electronic delay means 706 between the laser flash detector and the acoustooptic scanner. Alternatively, the delay can be provided by the optical scanner itself.

Optical scanner 703 can provide the gross delay by simply starting the scan of the optic fiber array some desired angular distance ahead of the start of the linear array of optical fiber entrance apertures as shown by gross delay period. This will provide any given delay time so long as the scanner has the capability of providing a long enough scan duration to cover the sum of the desired long and short delay times. The short (range gate) delay times are provided by the spacing between the optical fiber entrance apertures as shown by the range gate delay period in FIGS. 7A and 7B. The range gate delay times may be varied by varying the spacing between optical fibers 701 or by changing the velocity of scan line 704.

Figure 7B:
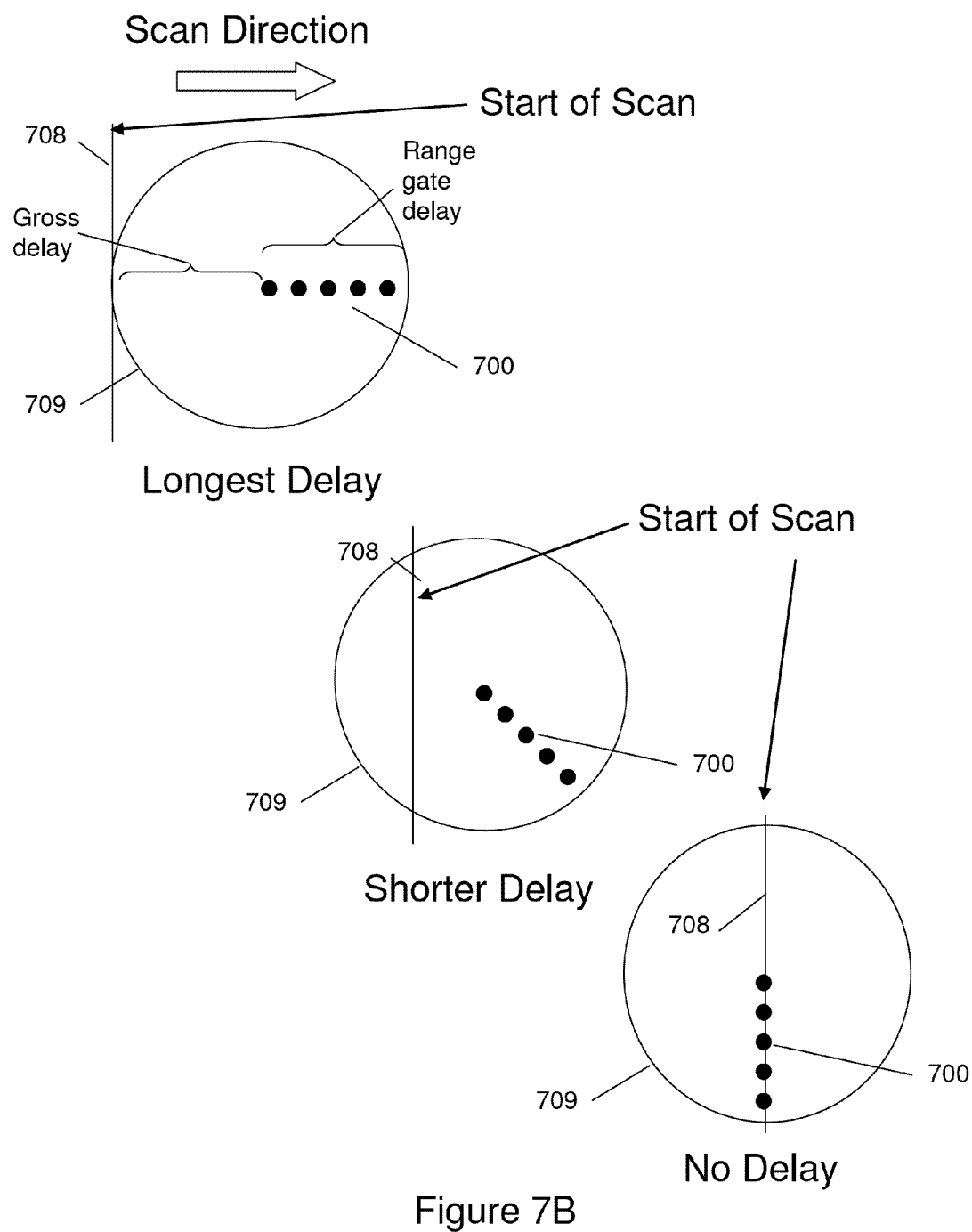
FIG. 7B is a schematic diagram of a further enhancement to a delay line system for a light-emitting detection apparatus, in accordance with the seventh embodiment of the invention.

FIG. 7B illustrates how the range gate delay times may be varied by passing an expanded beam (i.e., a scanned line) 708 across optical fiber linear array 700 where linear array 700 is capable of rotating perpendicular to the scan path of line beam 708 by mounting on rotating mount 709. The spacing between each optical fiber in array 700 will vary as a cosine function and is controlled (assuming a constant velocity scan) by simply rotating linear array mount 709 and moving the scan start closer to fiber array 700. This is illustrated in the middle and lower illustrations of FIG. 7B. This system also has the advantage of tailoring the light pulse temporal shape as it scans past each optical fiber entrance aperture. For example, a Gaussian pulse is simply provided by scanning a Gaussian distributed beam across the optical fiber entrance aperture. The duration of the Gaussian pulse is a function of the scanning velocity and the width of the optical fiber entrance aperture.

It should be noted that alternative embodiments of the invention may use various combinations of the components described above. For example, they may use laser or other types of light sources, optical fiber or electronic delay mechanisms, or three-dimensional or two-dimensional targets. Other variations that are not specifically described may also be suitable for the different embodiments of the invention. For instance, fixed or zoom lenses may be used to adjust the target field of view, and different types of light pulses (e.g., fixed intensity, shaped, etc.) may be employed.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

The invention claimed is:

1. A system for calibrating a Light Detection and Ranging (LIDAR) unit, the system comprising:
   a light pulse detection unit configured to receive a first light pulse from the LIDAR unit;
   a delay unit coupled to the light pulse detection unit and configured to produce one or more delayed light pulses, wherein each of the delayed light pulses is delayed by a corresponding known interval from the first light pulse received from the LIDAR unit; and
   a target having at least two dimensions, wherein the target is configured to be illuminated by the delayed light pulses, thereby creating corresponding return light pulses, wherein different portions of the target at different positions within a field of view of the LIDAR unit produce different ones of the return light pulses, and wherein the different portions of the target delay the corresponding ones of the return light pulses by different, known amounts of time, wherein each of the return light pulses is returned from the corresponding portion of the target to the LIDAR unit with a corresponding known total delay.

2. The system of claim 1, wherein the known delay corresponding to each of the delayed light pulses is greater than a time required for light to traverse a physical distance from the LIDAR unit to the target and back to the LIDAR unit.

3. The system of claim 1, wherein the target comprises a plurality of two-dimensional target images, and wherein the system further comprises a light tube configured to combine the plurality of two-dimensional target images into a single combined two-dimensional image that is presented to the LIDAR unit.

4. The system of claim 1, further comprising a lens configured to adjust a field of view of the target as presented to the LIDAR unit.

5. The system of claim 1, wherein the delay unit comprises a first length of optical fiber coupled to receive the light pulse from the LIDAR unit and to transmit the light pulse from the LIDAR unit to the target as at least one of the one or more delayed light pulses.

6. The system of claim 5, further comprising one or more optical splitters and one or more additional optical fibers, wherein the optical splitters are configured to split a light pulse emitted from the first length of optical fiber into a first plurality of light pulses, and wherein each of the first plurality of light pulses is transmitted through one or more of the additional optical fibers, thereby imparting a corresponding range gate delay.

7. A system for calibrating a Light Detection and Ranging (LIDAR) unit, the system comprising:
   a light pulse detection unit configured to receive a light pulse from the LIDAR unit;
   a delay unit coupled to the light pulse detection unit and configured to produce one or more delayed light pulses, wherein each of the delayed light pulses is delayed by a corresponding known interval from the light pulse received from the LIDAR unit; and
   a target having at least two dimensions, wherein the target is configured to be illuminated by the delayed light pulses, wherein target illumination from each of the delayed light pulses is returned to the LIDAR unit with a corresponding known delay,
   wherein the delay unit comprises an electronic controller and a light source, wherein the electronic controller is triggered by the light pulse from the LIDAR unit, wherein the electronic controller is configured to control the light source to generate the one or more delayed light pulses at the corresponding known intervals after being triggered by the light pulse received from the LIDAR unit.

8. The system of claim 7, wherein the electronic controller is configured to control the light source to generate the one or more delayed light pulses in succession, with each of the delayed light pulses separated from adjacent ones of the delayed light pulses by a range gate delay.

9. The system of claim 8, wherein each of the delayed light pulses is modulated by one or more two-dimensional optical modulators, thereby presenting a series of range gate images to the LIDAR unit.

10. The system of claim 7, further comprising one or more optical shutters, wherein the optical shutters are configured to gate a single delayed light pulse generated by the light source to produce multiple delayed light pulses.

11. The system of claim 1, wherein the target comprises a three-dimensional object, and wherein the delayed light pulses are reflected off the three-dimensional object to create the target illumination that is returned to the LIDAR unit.

12. The system of claim 1, wherein the target comprises one or more two-dimensional optical modulators.

13. The system of claim 12, wherein the optical modulators comprise transmissive optical modulators.

14. The system of claim 12, wherein the optical modulators comprise reflective optical modulators.

15. A system for calibrating a Light Detection and Ranging (LIDAR) unit, the system comprising:
   a light pulse detection unit configured to receive a light pulse from the LIDAR unit;
   a delay unit coupled to the light pulse detection unit and configured to produce one or more delayed light pulses, wherein each of the delayed light pulses is delayed by a corresponding known interval from the light pulse received from the LIDAR unit; and
   a target having at least two dimensions, wherein the target is configured to be illuminated by the delayed light pulses, wherein target illumination from each of the delayed light pulses is returned to the LIDAR unit with a corresponding known delay, wherein the delay unit comprises an electronic controller and a light source, wherein the electronic controller is triggered by the light pulse from the LIDAR unit, wherein the electronic controller is configured to control the light source to scan a beam generated by the light source across entrance apertures of a plurality of optical fibers, wherein each of the optical fibers carries a corresponding light pulse to the target.

16. The system of claim 15, wherein the beam is scanned across the entrance apertures of the optical fibers sequentially to create a range gate delay between light pulses of successive ones of the optical fibers.

17. The system of claim 16, wherein the entrance apertures of the optical fibers are arranged in a linear array.

18. The system of claim 17, wherein the beam is a linearly expanded beam, and wherein an angle between the linearly expanded beam and the linear array of entrance apertures is adjustable to vary the range gate delay between light pulses of successive ones of the optical fibers.

19. A method for calibrating a Light Detection and Ranging (LIDAR) unit, the method comprising:

emitting a first light pulse from the LIDAR unit;

receiving the first light pulse from the LIDAR unit in a light pulse detection unit;

generating one or more delayed light pulses, wherein each of the delayed light pulses is delayed by a corresponding known interval from the first light pulse received from the LIDAR unit;

illuminating a target having at least two dimensions with the delayed light pulses, thereby creating corresponding return light pulses, wherein different portions of the target at different positions within a field of view of the LIDAR unit produce different ones of the return light pulses, and wherein the different portions of the target delay the corresponding ones of the return light pulses by different, known amounts of time;

receiving each of the return light pulses at the LIDAR unit with a corresponding known total delay; and adjusting a range calibration of the LIDAR unit based on the known total delay corresponding to each of the return light pulses.

* * * * *